United States Patent Office 2,853,533
Patented Sept. 23, 1958

2,853,533

ACTIVE CLAYS AS CATALYST ATTENUATOR IN THE ALKYLATION OF AROMATICS

Leo J. Weaver, Wakefield, Mass., assignor to Monsanto Chemical Company, St. Louis, Mo., a corporation of Delaware No Drawing. Application January 13, 1956
Serial No. 558,853

14 Claims. (Cl. 260—671)

The present invention relates to a novel process for the preparation of alkylated aromatics. More specifically, the present invention is directed to a process for the alkylation of aromatic hydrocarbons with olefin hydrocarbons in the presence of a catalyst comprising a Friedel-Crafts-type catalyst and a minor amount of an active clay composition.

The alkylation of aromatic hydrocarbons with olefin hydrocarbons to produce higher molecular weight alkyl aromatics in the presence of Friedel-Crafts-type catalysts, preferably an aluminum halide, such as aluminum chloride, has been known to the art for a considerable period of time. Other Friedel-Crafts-type catalysts, such as aluminum bromide, ferric chloride, zinc chloride, stannic chloride, zirconium chloride, and the like have also been disclosed as suitable for the preparation of alkyl aromatics. The Friedel-Crafts catalysts, and especially aluminum chloride, are extremely versatile catalysts. Thus aluminum chloride is well known as an active agent for the addition of aromatic compounds to olefinic double bonds and is widely used as a condensation agent in alkylation reactions. However anhydrous aluminum chloride is a powerful polymerizing agent as well as a condensation agent. Aluminum chloride is also an effective catalyst for reactions involving decomposition as in cracking petroleum hydrocarbons and dealkylation reactions, isomerization reactions such as aromatic rearrangements and migrations, ring-closure, dehydrogenation, etc. Accordingly it is recognized that the use of the various Friedel-Crafts catalysts introduce many side reactions into a process and it is necessary to carefully control the process in order to obtain the desired product.

The alkylation of aromatic compounds with olefin hydrocarbon in the presence of Friedel-Crafts catalysts thus comprises a complicated reaction series and there is some confusion about the exact nature of the steps in the reaction. The preparation of many alkyl aromatic compounds is within a highly competitive and active field; for example, the preparation of the higher alkyl aromatic compounds which are useful intermediates in the preparation of alkyl aryl sulfonate detergent compositions, and polyalkyl aromatics which are useful in oil compositions. Accordingly a major problem in the industry has been to find a means for controlling the alkylation reaction to provide higher yields of the desired products.

The principal object of this invention is to provide an efficient and economical means of better controlling the Friedel-Crafts alkylation of aromatic compounds with an olefin hydrocarbon. Another object of this invention is to provide a novel process for the preparation of higher alkyl aromatic compounds in improved yields. Still another object of this invention is to provide a novel process whereby the alkylation of benzene with a tetrapropylene to produce dodecylbenzene may be controlled to effect a higher yield of the desired product. A further object of this invention is to directly produce an alkylaromatic hydrocarbon which is substantially free from color, i. e., is water white. Other objects will be apparent from the following disclosure.

It has now been found that the attenuation of the Friedel-Crafts catalyst system with a critical amount of an active, or bleaching, clay provides a process for the alkylation of aromatic compounds with olefin hydrocarbons wherein the desired reaction can be more effectively controlled to obtain a higher yield of the desired product and the products obtained are superior to the prior art products in that they possesses a markedly superior "color" being substantially water white.

The optimum ratio of active clay to Friedel-Crafts catalyst will vary somewhat depending on the specific clay and catalyst employed as well as the nature and ratio of the aromatic compound and the olefin; the specific processing conditions employed, as for example, batch alkylation, continuous alkylation, recycle of the hiboiler, alkylation temperature, etc. The specific ratio desired can be readily determined for any particular system as hereinafter more fully exemplified. In general however up to about 50 weight percent of active clay, based on the Friedel-Crafts catalyst, can be employed.

It is acknowledged that various of the Friedel-Crafts catalysts have been employed with various carriers in prior art alkylation procedures. The carriers have included alumina, silica-alumina composites, clays, diatomaceous earth, charcoal, etc., but the carrier was present in a major amount in relation to the catalyst in contradistinction to the novel process of this invention wherein only specific active clays are applicable and the weight ratio of active clay to catalyst is a critical limitation below about 0.5. In general the prior art use of the various carriers was to facilitate continuous processing with the liquid or gas phase passing through a solid catalyst bed, such as the fixed bed, moving bed, or fluidized bed systems.

Also small amounts of active clays have been empolyed to improve the color of alkyl aromatic compounds after they have been produced. The instant process now affords a direct color improvement of the product in addition to the improved control of the process and the higher net yield of the desired product from both the alkylation process and the elimination of product loss with the bleaching clay added subsequent to its manufacture.

The active clay and catalyst can be premixed in the desired ratio and added to the aromatic compound in the reaction vessel under conditions which effect efficient mixing, or they can be added separately. Where a continuous alkylation process is employed and the attenuator and catalyst are added separately it is desirable to provide the feed system with an interlocking means to assure proper proportioning throughout the run, since as hereinafter shown the ratio of active clay to the catalyst is critical and failure of complete alkylation occurs with large amounts of the active clay. In general the separate addition of the above components is preferred since this procedure normally provides a better control of the alkylation process, especially where minor variations in the ratio may be necessary as during the usual continuous commercial process.

The mixed catalyst can be prepared by mixing small increments of the active clay into the powdered, anhydrous catalyst with mild agitation in a dry, vented, corrosion-resistant vessel, which is provided with a means of excluding atmospheric moisture. For example, the preparation of a mixture of Superfiltrol and anhydrous aluminum chloride initially effects a vigorous evolution of hydrogen chloride due to the free moisture content of the clay and results in a general fluffing and increase in volume as the reaction proceeds. After all of the clay is introduced agitation is continued for a sufficient period to insure a substantially uniform mixture. The catalyst mixture is then protected from atmospheric moisture by any suitable means.

In general the active clay material should be low in free water, since if from about 400–500 p. p. m., based on the reaction mixture, of free water is present in the system the alkylation process cannot go to completion or is greatly inhibited unless additional, otherwise unnecessary, catalyst is employed. Thus the active clay should be dried at a temperature of from about 212 to 220° F. for a period of several hours if it contains excessive free moisture, but in no event should the active clay be heated to a temperature sufficiently high to drive off the water of hydration or combined water, since the active clay is reduced to a substantially inert material, insofar as the instant process is concerned, by such processing.

The suitable active clays are those of natural origin such as fuller's earth, and those that can be made active by processing such as by acid treatment. These active clays are characterized by the presence therein of replaceable bases. The substantially non-swelling type of bentonites can be readily activated by well known prior art methods, as for example, by making an aqueous slurry thereof to which a small amount of sulfuric acid is added and thereafter agitating the mixture at a temperature of from about 212 to about 220° F. for a period of from about 2 to about 12 hours, and then drying the composition and reducing same to a powder. The principal constituents of fuller's earth are montmorillonite and attapulgite, and of bentonite are montmorillonite and beidellite. Other suitable montmorillonite-type active clay minerals are for example nortronite, saponite, and hectorite. Various hydrated aluminum silicates of the kaolinite type may also be employed, such as, kaolinite, dickite, nacrite, anauxite, halloysite, and endellite. The activated bentonites are the preferred active clay materials and can be obtained under various trade names, as for example, Superfiltrol, produced by the Filtrol Corp., Pikes Peak Clay from General Reduction Co., etc.

Upon completion of the alkylation it has been found that substantially all of the active clay (about 95 to about 98 percent) separates out from the alkylated liquor with the catalyst complex. It was further found that the small amount of residual clay contained in the alkylated liquor can be removed by washing the alkylated liquor with about an equal volume of water, wherein the clay is transferred to the aqueous phase or contained at the interface between the two phases. The washed alkylated liquor feed stream to the distillation system was found to be clear of foreign matter traceable to the presence of the clay. The alkylated liquor can also be filtered by any suitable means instead of washing, or in addition to washing, if desired.

The aforesaid attenuated catalyst system is applicable to the alkylation of an aromatic compound with an olefin generally, but is particularly useful with olefins containing up to about 20 carbon atoms, and preferably olefins containing from 5 to 20 carbon atoms are employed. One of the major uses of the instant invention is in the preparation of the higher alkyl aromatic compounds which are particularly useful as detergent intermediates, i. e., those compounds wherein the alkyl group contains from about 9 to about 16 carbon atoms, and preferably those containing an average of about 12 carbon atoms. Suitable alkenes are, for example, ethylene, propylene, the butylenes, 1-pentene, 1-decene, 1-dodecene, 1-octadecene, tetrapropylene, hexapropylene, pentabutylene, other olefin polymers, i. e. propylene polymers, and the like, and mixtures thereof.

Suitable aromatic hydrocarbons are, for example, benzene, toluene, xylene, naphthalene, tetralin and various other alkylbenzenes and alkylnaphthalenes, preferably having a molecular weight of less than about 200.

To effect improved yields of the monoalkylation product the aromatic hydrocarbon should be present in a molar excess over the olefin. Generally from about 3 to about 10 or more moles of the aromatic hydrocarbon are employed per mole of the olefin, and the preferred mole ratio ranges from about 6:1 to about 8:1. Since alkylations conducted by a batch process normally are effected by adding all of the aromatic hydrocarbon to the reaction vessel and subsequently slowly adding the olefin thereto while the reaction mixture is being agitated, it is clear that the lower mole ratios may be safely employed as the effective mole ratio during the reaction will always be substantially larger than the apparent mole ratio calculated from the amounts of materials employed. Also a large excess of catalyst is initially present in the batch process. Obviously a continuous process requires the constant addition of both aromatic hydrocarbon and olefin at a uniform rate and the higher mole ratios should preferably be employed, since this is the effective ratio in the alkylation process.

The mole ratio of the catalyst to the olefin will vary somewhat depending on the choice of each, but may range from about 0.03:1.0 to about 0.1:1.0 and preferably should not exceed about 0.05:1.0. When the catalyst is anhydrous aluminum chloride the preferred ratio is about 0.04:1.0. The Friedel-Crafts catalyst may be promoted by any means known to the art, as for example, the introduction of a small amount of hydrogen chloride into the reaction system, or the introduction of small amounts of water, acid chlorides, etc. When hydrogen chloride is employed, up to about 0.4 percent by weight of the total reactants is adequate.

The alkylation temperature of the instant process can vary from about 25 to about 90° C. and preferably from about 25 to about 60° C., with an optimum preference in the range of from about 30 to about 35° C. The lower olefins are gases and therefore their use requires the employment of a pressure vessel. Pressures of up to about 50 atmospheres will be adequate for these systems, but higher pressures may be employed if desired. The alkylation time for the process of this invention normally ranges from about 0.5 to about 1 hour, but longer periods may be employed. A sojourn time of about 0.8 hour was found suitable in the continuous process and about 0.6 hour was suitable in the batch process.

The following examples are illustrative of this invention.

A series of experiments were run wherein all variables were held constant except for: (1) the weight ratio of the active clay attenuator to the aluminum chloride, (2) the amount of aluminum chloride employed, and (3) the specific active clay attenuator employed, which materials and quantities were varied as indicated in Table I. The procedure employed in Examples 1 through 9 was as follows: One thousand parts by weight of dried benzene (100–150 p. p. m. of water) and the designated amount of commercial anhydrous aluminum chloride were charged into a closed reaction vessel provided with a stirring device capable of vigorously agitating the mixture. While said mixture was being agitated, a small amount (0.2 to 0.3 percent by weight of the total reactants) of anhydrous hydrogen chloride gas was introduced into the reaction vessel through a sparger located below the surface of the benzene until the evolution of hydrogen chloride gas was noted at the top of the reflux condenser. Then the designated amount of the active clay attenuator was introduced to the reaction vessel while still maintaining vigorous agitation. Thereafter 320 parts by weight of tetrapropylene was slowly introduced over a period of about 20 minutes. The temperature of the reaction mixture was held at from about 30 to about 35° C. throughout the process by means of a cooling coil in the reaction vessel. Agitation was continued for about 15 minutes after all of the olefin had been introduced. Then agitation was terminated and the reaction mixture allowed to stand for about 30 minutes during which time the catalyst complex settles and was separated from the alkylation mass. The alkylation mass was then washed with an equal volume of water at 25° C. and dried over calcium sulfate. The dried washed alkylated liquor was then fractionated into four fractions consisting of: (1) the excess benzene employed in the reaction, (2) the intermediate, (3) the dodecylbenzene (DDB), and (4) the residue or high boiling fraction. The cut ranges employed were as follows, (1) benzene up to a vapor temperature of 115–120° C. at atmospheric pressure, then (2) intermediate up to a vapor temperature of 110–112° C. at 20 mm. mercury pressure, then (3) the dodecylbenzene fraction up to a vapor temperature of 155–157° C. at 2 mm. mercury pressure, and (4) the residue. The results of this series of experiments are shown in Table I.

*Table I*

| Example No. | Parts by Weight | | Ratio[1] | Percent Composition | | |
|---|---|---|---|---|---|---|
| | Attenuator | AlCl₃ | | Intermediate | DDB | Hiboiler |
| 1 | | 11 | 0 | 11.0 | 77.0 | 12.0 |
| 2 | 2 SF | 11 | 0.18 | 8.9 | 79.5 | 11.6 |
| 3 | 2 FE | 11 | 0.18 | 8.5 | 79.5 | 12.0 |
| 4 | 3 SF | 11 | 0.27 | 8.4 | 79.5 | 12.1 |
| 5 | 4 SF | 11 | 0.36 | 7.3 | 80.9 | 11.8 |
| 6 | 4 SF | 10 | 0.40 | 5.5 | 72.1 | 22.4 |
| 7 | 5 SF | 11 | 0.45 | 6.0 | 68.0 | 26.0 |
| 8 | 5.5 SF | 11 | 0.50 | (2) | | |
| 9 | 4 SF | 8 | 0.50 | (2) | | |

[1] Ratio of attenuator:AlCl₃.
[2] Incomplete alkylation, bromine number greater than 5.
SF = Superfiltrol.
FE = Fuller's earth.

From the above data it is apparent that the introduction of a critical small amount of an active clay attenuator to the reaction mixture provides an improved means for controlling the alkylation reaction. Thus a small amount of the active clay attenuator favors the production of the desired monoalkylation product at the expense of the polyalkylation product and the intermediate products. As the weight ratio of attenuator to aluminum chloride is increased above about 0.36 the production of the polyalkylate is increased, but still with low yields of the undesirable intermediate fraction. When the ratio exceeds about 0.45 the alkylation is incomplete as indicated by a rapid rise in the bromine number of the alkylation mixture. Accordingly the critical amount of attenuator selected will depend primarily on the relative values of the monoalkylate and the polyalkylate.

Where the principal product desired is the monoalkylate, the net yields of this product can be improved by recycling the polyalkylate fraction in the subsequent alkylations. Thus by employing the process described above for Examples 1 through 9, but recycling the polyalkylate at the rate of about 15 parts by weight of polyalkylate per 100 parts by weight of olefin the results shown in Table II were obtained.

*Table II*

| Example No. | Parts by Weight | | Ratio[2] | Percent Composition[1] | | |
|---|---|---|---|---|---|---|
| | Superfiltrol | AlCl₃ | | Intermediate | DDB | Hiboiler |
| 10 | 0 | 11 | 0 | 12.4 | 81.6 | 6.0 |
| 11 | 1.5 | 11 | 0.14 | 9.6 | 82.4 | 8.0 |
| 12 | 2 | 11 | 0.18 | 8.8 | 85.4 | 5.8 |
| 13 | 2.5 | 11 | 0.23 | 8.4 | 83.5 | 8.1 |
| 14 | 4 | 11 | 0.36 | 6.8 | 82.0 | 11.2 |

[1] Corrected for recycle of hiboiler.
[2] Ratio of attenuator:AlCl₃.

Again it is noted that the initial addition of small amounts of active clay attenuator to the reaction mixture materially improves the yield of the monoalkylate and subsequently the polyalkylate begins to increase, but the undesirable intermediate fraction is continually reduced.

The effect of varying the mole ratio of the benzene to the olefin in the presence of the attenuated catalyst system (4 parts active clay plus 11 parts of anhydrous aluminum chloride per 320 parts of olefin) is shown in Table III. The alkylation process employed for Examples 15 through 17 was similar to that disclosed for Examples 1 through 9, with the exceptions noted above and in the table below.

*Table III*

| Example No. | Parts by Weight | | Mole ratio of Benzene to Olefin | Percent Composition | | |
|---|---|---|---|---|---|---|
| | Benzene | Olefin | | Intermediate | DDB | Hiboiler |
| 15 | 500 | 320 | 3.2 | 13.1 | 57.1 | 29.8 |
| 16 | 1,000 | 320 | 6.4 | 6.9 | 79.0 | 14.1 |
| 17 | 800 | 160 | 10.5 | 6.8 | 80.0 | 13.2 |

These results show a similarity to the non-attenuated alkylation systems in that an increase of the mole ratio of benzene to olefin favors monoalkylation, where the catalyst to olefin ratio remains substantially constant, and represses the other reactions competing with the monoalkylation. In addition the presence of the active clay attenuator further represses the reactions which produce the components contained in the intermediate fraction i. e. fragmentation, hydrogen transfer to produce alkanes, etc. and may further alter the relative proportions of the monoalkylate and polyalkylate fractions by changing the ratio of active clay attenuator to aluminum chloride as indicated in Examples 1 through 14.

Additional experiments were run to show the effect of other Friedel-Crafts catalysts in the instant process, two of which are exemplified below. These examples were run in the equipment described regarding Examples 1–9. Eighteen parts by weight of anhydrous zirconium tetrachloride was suspended in 1000 parts by weight of dried benzene and 320 parts by weight of tetrapropylene was gradually added thereto over a 20-minute period of time. The temperature rose from about 30° C. to about 63° C. during this addition period. Thereafter the procedure of Examples 1–9 was followed. Example 19 was run as above, but in addition 2 parts by weight of Superfiltrol were added along with the zirconium tetrachloride, wherein the weight ratio of attenuator to catalyst is 0.11. The quantity of zirconium tetrachloride employed in these examples is calculated to be about 0.04 mole per mole of olefin. The product fractions were found to be as follows:

| Example No. | Percent Composition | | |
|---|---|---|---|
| | Intermediate | DDB | Hiboiler |
| 18 | 9.7 | 82.3 | 8.0 |
| 19 | 3.1 | 82.4 | 14.5 |

Zirconium tetrachloride is a milder catalyst than aluminum chloride, but the beneficial effect of small amounts of the active clay attenuator is clearly shown in materially reducing the quantity of undesirable intermediate formed in the alkylation process.

Other Friedel-Crafts catalysts, active clays, aromatic hydrocarbons, and olefins, as disclosed in the foregoing specification, can be employed in a like manner to the above illustrative examples and within the limits of the following claims to obtain the desired alkylated aromatic compound.

I claim:

1. A process for producing alkylated aromatic hydrocarbons which comprises subjecting an olefin and a molar excess of an aromatic hydrocarbon to contact under alkylating conditions at a temperature of from about 25° C. to about 90° C. in the presence of a Friedel-Crafts catalyst and up to about 0.5 part by weight, based on the said catalyst, of an active clay.

2. The process of claim 1, wherein the olefin contains up to about 20 carbon atoms and the aromatic hydrocarbon has a molecular weight of less than about 200.

3. The process of claim 2, wherein the Friedel-Crafts catalyst is aluminum chloride.

4. The process of claim 2, wherein the Friedel-Crafts catalyst is zirconium tetrachloride.

5. A process for producing alkylated aromatic hydrocarbons, which comprises contacting a molar excess of an aromatic hydrocarbon having a molecular weight of less than about 200 with an olefin containing from 9 to 16 carbon atoms at a temperature in the range of from about 25° to about 60° C. in the presence of about 0.04 mole of anhydrous aluminum chloride per mole of olefin and from about 0.1 up to about 0.45 parts by weight of an active clay per part by weight of the anhydrous aluminum chloride.

6. The process of claim 5, wherein the active clay is an active, non-swelling bentonite clay.

7. The process of claim 5, wherein the active clay is fuller's earth.

8. The process of claim 6, wherein the olefin is a propylene polymer.

9. The process of claim 7, wherein the olefin is a propylene polymer.

10. A process for producing dodecylbenzene, which comprises contacting a molar excess of benzene with tetrapropylene in the temperature range of from about 25° to about 60° C. in the presence of about 0.04 mole of anhydrous aluminum chloride per mole of tetrapropylene and from about 0.1 up to about 0.45 part by weight of an active clay per part by weight of the anhydrous aluminum chloride.

11. The process of claim 10, wherein the active clay is an active, non-swelling bentonite clay.

12. The process of claim 10, wherein the active clay is fuller's earth.

13. The process of claim 11, wherein the temperature range is from about 30° to about 35° C.

14. The process of claim 12, wherein the temperature range is from about 30° to about 35° C.

References Cited in the file of this patent

UNITED STATES PATENTS

| | | |
|---|---|---|
| 2,242,960 | Sachanen et al. | May 20, 1941 |
| 2,313,053 | De Simo et al. | Mar. 9, 1943 |
| 2,597,834 | Claussen | May 20, 1952 |